June 22, 1965   W. G. STOPPE   3,190,583
VARIABLE LIFT WING
Filed July 17, 1963   4 Sheets-Sheet 1
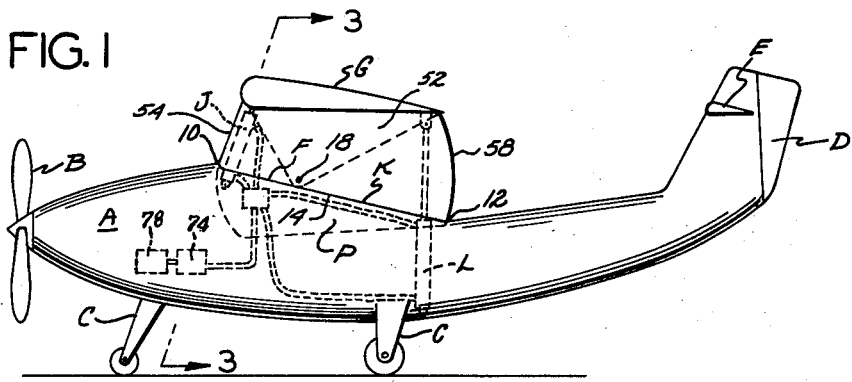
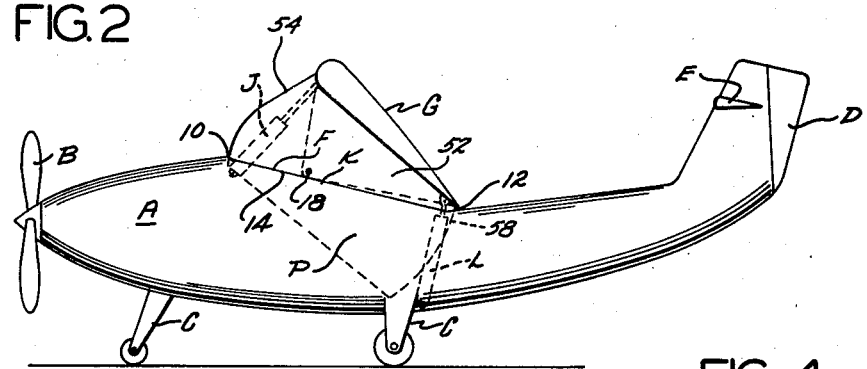
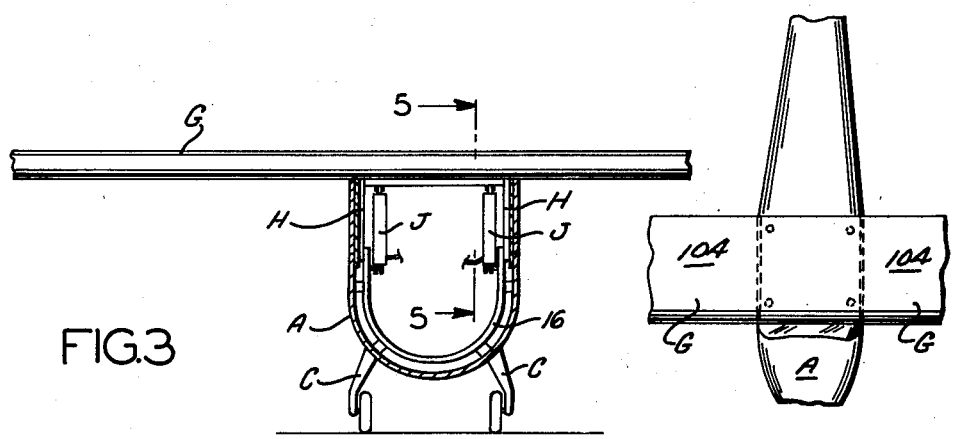
INVENTOR.
WILLY G. STOPPE
BY
William C. Babcock
ATTORNEY

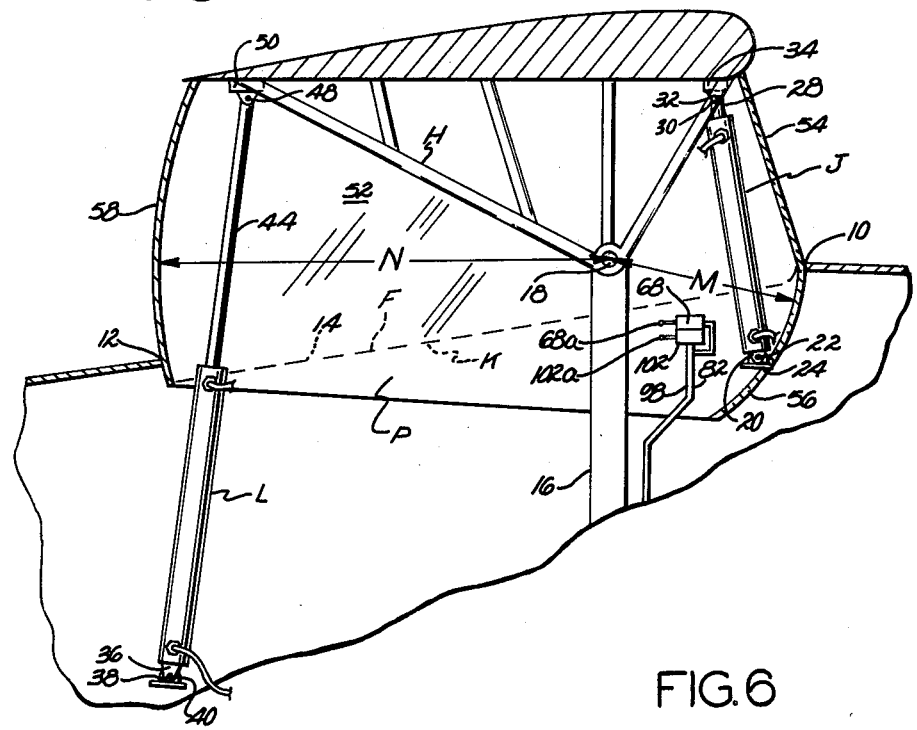
FIG. 5
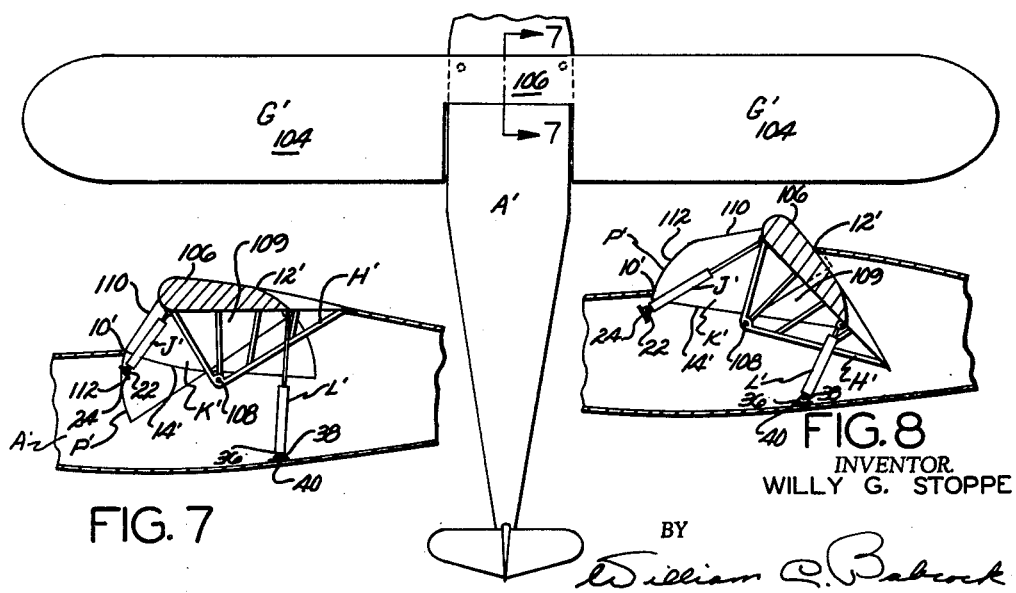
FIG. 6
FIG. 7
FIG. 8
INVENTOR
WILLY G. STOPPE
BY
William C. Babcock
ATTORNEY June 22, 1965  W. G. STOPPE  3,190,583
VARIABLE LIFT WING
Filed July 17, 1963  4 Sheets-Sheet 3

INVENTOR.
WILLY G. STOPPE
BY
*William G. Babcock*
ATTORNEY

June 22, 1965 W. G. STOPPE 3,190,583
VARIABLE LIFT WING
Filed July 17, 1963 4 Sheets-Sheet 4

INVENTOR.
WILLY G. STOPPE
BY
William C. Babcock
ATTORNEY

UNITED STATES PATENT OFFICE 3,190,583
Patented June 22, 1965

3,190,583
VARIABLE LIFT WING
Willy G. Stoppe, Long Beach, Calif., assignor of
one-half to Nancy Vos, Long Beach, Calif.
Filed July 17, 1963, Ser. No. 295,754
6 Claims. (Cl. 244—48)

The present invention relates generally to the field of aircraft, and more particularly to an airplane including one or more tiltable airfoil surfaces to selectively vary the lift, glide and landing characteristics of the plane.

A major object of the present invention is to provide an airplane having one or more adjustable airfoil surfaces which may be so disposed as to shorten the distance required for take-off as well as landing of the plane, yet when in flight may be positioned to increase or decrease the lift of the airfoil surfaces, and by sequential tilting thereof may be utilized to materially reduce the speed of the airplane in steps, prior to the landing thereof.

Another object of the invention is to provide a tiltable airfoil surface that may be used equally well on high, middle or low wing aircraft designs, is of relatively simple mechanical structure, and requires a minimum of maintenance attention.

Yet another object of the invention is to provide an adjustable airfoil surface for use with jet powered aircraft, as well as movable flaps which can be selectively positioned in the discharge of the jet engine to guide the plane and at the same time increase the lift thereof, with the airfoil surface, in the event of power failure, being adjustable to act as a semi-parachute in the landing of the plane at a slow and relatively safe speed even on rough terrain.

These and other objects and advantages of the invention will become apparent from the following description of a first and an alternate form thereof, and from the accompanying drawings illustrating the same, in which:

FIGURE 1 is a side elevational view of an airplane incorporating the tiltable airfoil structure which is disposed in a substantially horizontal position;

FIGURE 2 is a side elevational view of the plane shown in FIGURE 1, but with the airfoil in a tilted position;

FIGURE 3 is a vertical cross-sectional view of the airplane shown in FIGURE 1, taken on line 3—3 thereof;

FIGURE 4 is a fragmentary top plan view of the center of the plane shown in FIGURE 1;

FIGURE 5 is a fragmentary vertical cross-sectional view of the plane, taken on line 5—5 of FIGURE 3, showing in detail the apparatus used in adjusting the airfoil;

FIGURE 6 is a fragmentary top plan view of a first alternate form of airplane structure showing a tiltable airfoil used theerwith;

FIGURE 7 is a fragmentary side elevational view of the plane shown in FIGURE 6 showing the airfoil in a first position relative to the fuselage thereof;

FIGURE 8 is a second fragmentary side elevational view of the plane illustrated in FIGURE 6 showing the tiltable airfoil in a second position;

Figure 9:
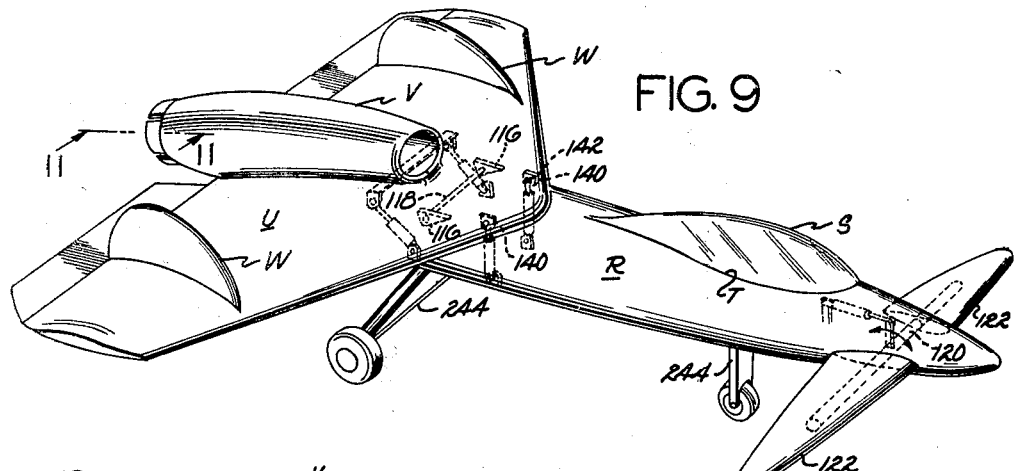
FIGURE 9 is a perspective view of a jet powered aircraft showing forwardly and rearwardly disposed tiltable airfoil surfaces, together with selectively positionable flaps that may be moved into the jet discharge stream to guide the plane.

With continuing reference to the drawings for the general arrangement of the first form of the invention, it will be seen in FIGURE 1 to include an airplane having a fuselage A, a driven propeller B, landing gear C, rudder D, and stabilizer E. The fuselage A is of conventional hollow construction, covered with a reinforced metal skin, and has a cockpit opening F therein that is defined by a transverse forward edge 10, a transverse rear edge 12, with the forward and rear edges being connected at the outer extremities thereof by downwardly and rearwardly extending side edges 14. Two laterally spaced, identical uprights 16 are disposed within the fuselage A in the positions shown in FIGURE 5, and the lower ends thereof are rigidly connected to the central bottom portion of the fuselage by conventional means (not shown).

A wing G extends transversly across the plane and serves to lift the plane upon actuation thereof. Two triangular, laterally spaced rigid frames H extend downwardly from the wing G, and are pivotally supported by pins 18 from the upper ends of the uprights 16. Two laterally spaced, forwardly disposed hydraulic cylinders J are disposed in the cockpit K of the fuselage A. A lug 20 is engaged by a pin 22 on the lower end of each cylinder J to pivotally support the hydraulic cylinder from a bracket 24 that is affixed to a convenient portion of the fuselage A.

Figure 13:
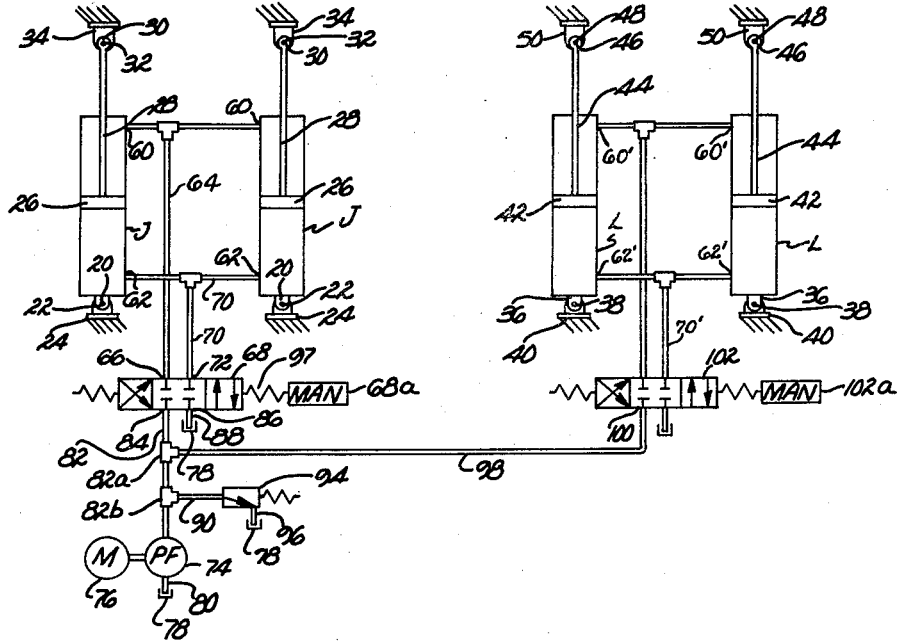
FIGURE 13 is a diagrammatic view of the hydraulic system shown in FIGURE 1.

Each of the cylinders J, as may best be seen in FIGURE 13, has a piston 26 slidably mounted therein, and each of these pistons is connected to a piston rod 28. An eye 30 is formed on the upper end of each piston rod 28 that is engaged by a pin 32, which in turn is connected to a portion 34 of the wing G. Two laterally spaced, vertical hydraulic cylinders L are also provided and situated within the confines of the cockpit K, as may best be seen in FIGURES 5 and 13. Each of the cylinders L has a lug 36 extending downwardly therefrom through which a pin 38 extends to pivotally connect the lug to a bracket 40 that is affixed to a convenient location within the fuselage A.

Each of the hydraulic cylinders L has a piston 42 slidably mounted therein that is connected to an upwardly extending piston rod 44, the upper end of which terminates in an eye 46. A pin 48 extends through each eye 46 that pivotally connects the eye to a portion 50 of the wing G, as best seen in FIGURES 5 and 13.

Two laterally spaced side walls 52 extend downwardly from the lower central portion of wing G, and these side walls are disposed adjacent the side edges 14 of the cockpit K. The side walls 52 are formed from a rigid transparent material having high tensile strength and durability, such as plexiglass, or the like. The forward edges of side walls 52 merge into a transversely extending forward wall 54, the upper end of which is connected to the forward portion of wing G.

The lower portion of the forward wall 54 which is also formed from a transparent material such as plexiglass, or the like, is curved (FIGURES 1 and 5) to define an arcuate forward wall portion 56. The radius of curvature of wall portion 56 is the distance M shown in FIGURE 5 extending from the center of pin 18 to the outside surface of the portion 56.

The rear edges of side walls 52 merge into a transverse rear wall 58 that is of arcuate transverse cross section, and has a radius of curvature N which is equal to the distance from the center of pin 18 to the exterior surface of this wall. By controlled discharge of hydraulic fluid to the cylinders J and L, by means to be explained in detail hereinafter, the wing G may be selectively locked in either a first position as shown in FIGURE 1, a second tilted position as shown in FIGURE 2, or a tilted position intermediate the first and second positions.

The adjustable tilting of the wing G may be utilized to reduce the distance required for take-off or in landing, reduce the landing speed, and by intermittent adjustment of wing position while the aircraft is in flight, but with the motor (not shown) thereof dead, glide the plane in a manner to reduce the speed in steps, whereby the final speed is sufficiently slow as to permit an emergency landing on relatively rough terrain.

It will be particularly noted in FIGURES 1, 2 and 5 that the transparent walls 52, 54 and 58 cooperatively define an enclosure P which fully protects the pilot (not shown) from the airstream and also minimizes formation of turbulence in the airstream sweeping across the surfaces of wing G.

The hydraulic apparatus employed in pivoting the wing G is illustrated in detail in FIGURE 13, and the hydraulic symbols used in this figure are those approved by the Joint Industry Conference as illustrated on pages 302–3 of the reference Hydraulic Power and Its Industrial Applications, 1960, by Walter Ernst, published by the McGraw-Hill Book Company, New York.

An opening 60 is formed at the top of each hydraulic cylinder J, and an opening 62 is formed at the bottom thereof. Openings 60 are connected to a conduit 64 that extends to one connection 66 of a three-position directional valve 68 (FIGURE 13) having four connections and a normally closed center. Openings 62 are connected by a conduit 70 to a connection 72 in valve 68. A fixed displacement pump 74 is provided that is driven by a prime mover 76. The suction to pump 74 is connected to a reservoir 78 by a conduit 80.

The discharge of pump 74 is connected to a conduit 82 that has two T's 82a and 82b therein. Conduit 82 is connected to a connection 84 on valve 68, and a connection 86 on valve 68 is connected by a conduit 88 to reservoir 78. Valve 68 is spring-loaded and manually operable to permit placement in either a first or second position. The motor 76 operates continuously to actuate pump 74, and fluid discharged through the conduit 82 bypasses through a conduit 90 to a maximum pressure valve 94, and after the fluid passes through the valve 94 it flows through a conduit 96 to reservoir 78.

When the valve 68 is moved to the left as illustrated in FIGURE 13, communication is established between the conduits 82 and 64 to permit discharge of fluid into the upper portions of cylinders J to move the pistons 26 downwardly and pivot the wing G from the second position shown in FIGURE 2 to that shown in FIGURE 1.

Concurrently with downward movement of pistons 26, fluid below the pistons is discharged through the conduits 70 and valve 68 to the conduit 88 to return to reservoir 78. When the valve 68 is not manually operated, due to spring means 97, the valve returns to the position shown in FIGURE 13, and the pistons 26 are locked in first positions in cylinders J, due to the hydraulic fluid situated above and below the pistons in the cylinder that cannot escape therefrom so long as the valve remains in the closed position.

If the valve 68 is moved to the right (FIGURE 13), communication is then established between the conduits 64 and 86, and between the conduits 82 and 70, with the flow of fluid to the cylinders being reversed and the pistons 26 moved upwardly to tilt the wing G from the position shown in FIGURE 1 towards that shown in FIGURE 2.

Inasmuch as the wing G is subjected to a substantial wind load as it moves through the air, it is desirable that the rear portion thereof be supported by the piston rods 44 as shown in FIGURE 5, and in detail in FIGURE 13. To permit the piston rods 44 to be moved as the wing G is pivoted between the first and second positions shown in FIGURES 1 and 2, hydraulic fluid under pressure is constantly supplied from the T 82a by conduit 98 to a connection 100 on a valve 102 that is identical to valve 68.

The conduit connections of the valve 102 to the hydraulic cylinders L are identical to that previously described pertaining to the cylinders J with which the same identifying numerals have been used but to which primes have been added. Thus, when it is desired to tilt the wings G, the manual controls 68a and 102a of valves 68 and 102, respectively, are manipulated to permit the flow of hydraulic fluid from pump 74 to the cylinders as required.

When the manual controls 68a and 102a are released, the valves automatically move to the closed position shown in FIGURE 13, and the piston rods 28 and 44 are locked against further movement to maintain the wings G in the desired position relative to the fuselage A. A model of the first form of the invention has been built and successfully flown. This model was radio-controlled as to the tilting of the wing G.

A first alternate form of the invention is shown in FIGURES 6–8 inclusive in which wings G' are provided that have two portions 104 that extend outwardly on each side of the fuselage A' and are connected by a wing portion 106. An open cockpit K' is formed in fuselage A' that is defined by a transverse forward edge 10', a rear edge 12' and side edges 14' which extend between the exterior end portions of the edges 10' and 12'. The wing portions 104 are pivotally supported by pins 108 that are supported at first positions relative to the fuselage A' by conventional means (not shown), such as uprights 16 shown in FIGURE 5. The wings G' adjacent the fuselage A' are supported by two frames H' that rotatably engage the pins 108.

A transparent enclosure P' is provided that includes two generally semi-circular transparent end pieces 109 that extend downwardly and forwardly from the wing portion 106, and a forward side wall 110 which extends below the edge 10' a substantial distance. A portion of the forward side wall 110 situated below the edge 10' is transversely curved, and the radius of curvature thereof is such that as the wings G' are adjusted between the positions shown in FIGURES 7 and 8, the lower portion 112 of the side wall is in sealing contact with the edge 10'.

The configuration of the upper surface of the wing portions 104 are such that as the wing portions pivot on the supports 108, the upper surfaces of these portions at all times remain in sealing contact with the edge 12'. The pivotal adjustment of the wings G' between the positions shown in FIGURES 7 and 8 is carried out by the use of the hydraulic circuit shown in FIGURE 13. Two forward hydraulic cylinders J' and two rear cylinders L' are mounted in the cockpit K', as shown in FIGURE 7, which are utilized to move the wings G' between the two positions shown in FIGURES 7 and 8 in the same manner as cylinders J and L are used to accomplish this result in the first form of the invention. The first alternate form of the invention is used in the same manner as the first form thereof.

Figure 14:
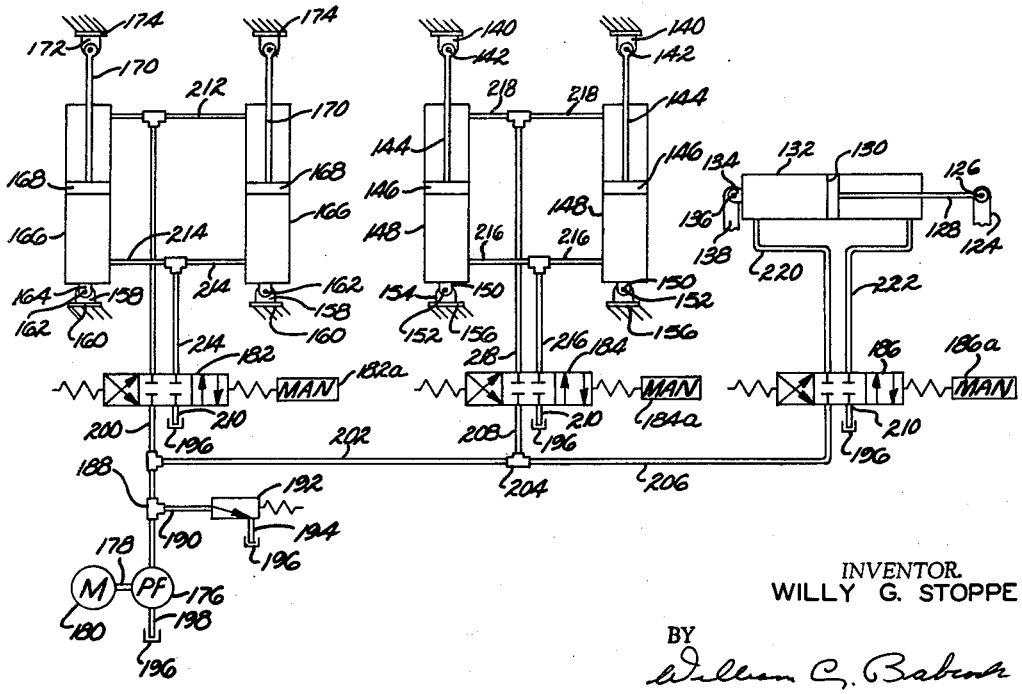
FIGURE 14 is a diagrammatic view of the hydraulic system in detail used in the plane shown in FIGURES 9–12 inclusive.

A second alternate form of the invention is shown in FIGURES 9–12 inclusive, and the hydraulic system used therewith is illustrated in FIGURE 14. This form of the aircraft includes an elongate fuselage R having a forwardly disposed transparent bubble S enclosing the pilot's cockpit T. A swept-back wing U is provided which not only presents the airfoil surface, but serves as a mounting for a jet engine V. Two laterally spaced vertical stabilizers W are mounted on the upper surface of wing U. A number of lugs 116 depend from the under surface of wing U that pivotally engage transverse pins 118 which are supported from the fuselage R by conventional means.

That portion of the fuselage R forwardly of the bubble

S rotatably supports a transverse shaft 120, and the projecting portions of this shaft are enveloped by horizontal stabilizers 122. That portion of the shaft 120 within the fuselage R has a lever 124 projecting upwardly therefrom that is pivotally connected by a pin 126 to the forward end of a piston rod 128. As may best be seen in FIGURE 14, piston rod 128 is connected to a piston 130 that is slidably mounted in a hydraulic cylinder 132. A lug 134 projects from the rear end of cylinder 132 that pivotally engages a pin 136 which is supported on the upper end of an upright 138, the lower end of which is connected to the fuselage R by conventional means (not shown).

The wing U also includes a pair of laterally spaced lugs 140 which are connected by pins 142 to the upper ends of piston rods 144. The piston rods 144 are in turn connected to pistons 146 that are slidably movable in hydraulic cylinders 148. Lugs 150 project from the lower ends of cylinders 148 and are pivotally engaged by pins 152, which in turn are supported by brackets 154 from lower interior portions 156 of the fuselage R, as shown in FIGURES 10 and 14.

Two laterally spaced brackets 158 are provided that are affixed by conventional means to lower interior portions 160 of the fuselage R, with the brackets supporting pins 162 therefrom. The pins 162 pivotally engage lugs 164 that are mounted on the lower ends of hydraulic cylinders 166. Pistons 168 are slidably mounted in cylinders 166, and these pistons are connected to upwardly extending piston rods 170 which are pivotally connected on their upper ends to lugs 172 affixed to portions 174 of the wing U.

Figure 10:
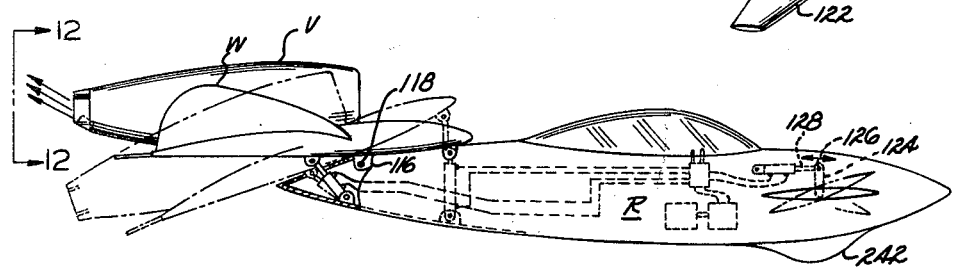
FIGURE 10 is a side elevational view of the plane shown in FIGURE 9, portions of which have been broken away to partially illustrate the hydraulic system used in tilting the airfoil surfaces.
Figure 11:
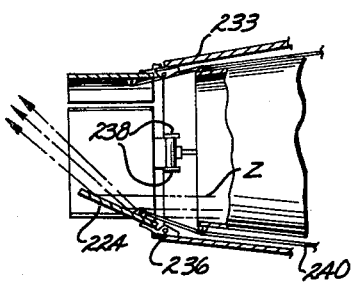
FIGURE 11 is a fragmentary vertical cross section of the rear of the jet engine showing the manner in which a number of hinged flaps may be selectively moved into the jet discharge stream to guide the plane.
Figure 12:
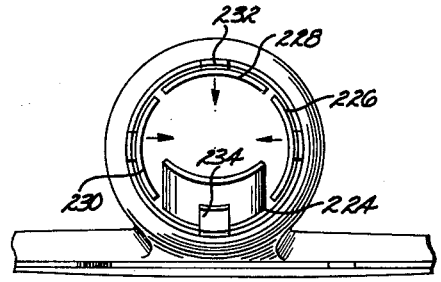
FIGURE 12 is a fragmentary rear elevational view of the plane shown in FIGURE 10 taken on line 12—12.

When the pistons 146 and 168 are moved in the cylinders 148 and 166 respectively, the piston rods 144 and 170 are moved to pivot the wing U between the first position shown in solid line in FIGURE 10 and a second position shown in phantom line in the same figure. Tilting of the wing U, together with the jet engine V affixed thereto, provides the same operational advantages as the tilting of the wings G and G' previously described in detail. The tilting of the wing U between the two positions mentioned above is effected by the discharge of hydraulic fluid under pressure to the cylinders 148 and 166.

Hydraulic fluid under pressure is supplied by a fixed displacement pump 176 that is driven by a shaft 178 connected to a motor or other prime mover 180. Three directional three-position, four-connection closed center valves 182, 184 and 196 are provided. A T 188 is connected to the discharge of pump 176 and also to a line 190 that in turn is connected to a maximum pressure valve 192. Valve 192 is connected by a line 194 to a hydraulic fluid reservoir 196. The suction of pump 176 is connected by a line 198 to reservoir 196. The T 188 is connected to a line 200 that extends to one connection on valve 182, and the line 200 has a lateral 202 extending therefrom to a T 204. T 204 is connected to a line 206 that extends to one connection on the valve 186, and to a line 208 extending to a connection on the valve 184.

Each valve 182, 184 and 186 has one connection thereon joined by a line 210 to reservoir 196. Openings are formed in the upper portions of cylinders 166 that are connected to a line 212 that extends to one connection on valve 182. Cylinders 166 also have connections in the lower end portions thereof that are connected to lines 214 which extend to one connection on the valve 182.

The upper ends of cylinders 148 have connections in the upper portions thereof that are joined to lines 218 which extend to one connection on valve 184. Connections on the lower end portions of the cylinders 148 are joined to lines 216 which extend to one connection on the valve 184.

The valves 182, 184 and 186 are controlled by spring-loaded handles 182a, 184a and 186a. The cylinder 132 has two connections on the end portions thereof, one of which is connected by a line 220 to one connection on the valve 186, with the other connection on the cylinder 132 having a line 222 extending therefrom to a connection on the valve 186. Due to the spring-loading thereof, the handles 182a, 184a and 186a normally maintain their associated valves in positions where fluid on both sides of the pistons 168, 146 and 130 is locked in the cylinders in which the pistons are mounted until the valves 182, 184 and 186 are manually moved to positions to permit discharge of fluid into one end of the cylinders with the concurrent discharge of fluid from the other end of the cylinder to permit the wing U to be tilted between the first and second positions previously mentioned, as well as to permit movement of the stabilizer 122.

When the handle 182a is moved to the left as illustrated in FIGURE 14, the flow of fluid to and from cylinders 166 is such that the piston 168 is moved downwardly therein, and pivots the wing U from the position shown in solid line in FIGURE 10 towards that shown in phantom line in the same figure. Movement of the handle 182a to the right reverses the flow of fluid to the cylinders 166, and the wing U is moved towards the position shown in FIGURE 10.

Movement of handle 184a to the right (FIGURE 14) results in flow of fluid to and from the cylinders 148 to move the piston rods 144 upwardly to move the wing U towards the position shown in phantom line in FIGURE 10. When handle 184a is moved to the left, the flow of fluid to and from the cylinders 148 is reversed to move the pistons 146 downwardly and pivot the wing U towards the position shown in solid line in FIGURE 10. When handle 186a is moved to the left, discharge of hydraulic fluid to and from the cylinder 132 occurs in a direction in which the stabilizer 122 is moved toward the position shown in phantom line in FIGURE 10. Movement of the handle 186a (FIGURE 14) to the right reverses the flow of fluid to and from the cylinder 132 in a direction to pivot the stabilizer 122 towards the position shown in solid line in FIGURE 10.

Guidance of the aircraft is conveniently carried out by means of four arcuate deflectors 224, 226, 228 and 230 that are each supported by hinges 232 from the rear portion 233 of the jet engine V. Each hinge 232 includes a central portion 234 that is pivotally mounted on a transverse pin 236, which pin is supported between two taps 238 that are affixed to the interior rear surface 233 of the jet engine V. By spring means or other conventional means, the deflectors 224, 226, 228 and 230 are held in rearwardly extending positions relative to the jet engine V and substantially parallel to the discharge therefrom.

Four cables 240 are provided that extend forwardly to the cockpit T, with each cable being connected to the deflectors 224, 226, 228 and 230 by tensioning any one of the cables by conventional means (not shown) located in the cockpit T. A deflector can be pivoted inwardly, as illustrated by the deflector 224 in FIGURE 11, and the deflector then directs a portion of the jet discharge stream Z upwardly at an angle relative to its direction of flow from the engine V, and this change of direction in the stream Z is reflected by downward movement imparted to the deflector 224 and the balance of the plane.

By manipulating the deflectors 224, 226, 228 and 230 the jet discharge stream Z can be deflected to impart desired horizontal or vertical lift to the rear portion of the second alternate form of the plane to guide the same. The second alternate form of the invention (FIGURE 10) is also provided with a rudder 242 that is pivotally supported from the plane in the forward position shown in FIGURE 10. By manual, hydraulic, electrical, or other conventional means the rudder 242 can be pivoted relative to the fuselage R to assist in guiding the plane.

A landing gear 244 of conventional structure is supported from the second alternate form of the aircraft, as shown in FIGURE 9, and this landing gear by manual or power means is retractable into the fuselage R after the plane is in flight.

The use and operation of the second alternate form of the invention has previously been described and need not be repeated.

In the operation of the three forms of the aircraft described herein, the fuselage thereof remains in a horizontal position during flight, and the speed in flight, as well as in landing, is controllable by the tilting of the wings thereof.

The speed of the three forms of the aircraft described herein can be substantially reduced prior to landing by controlled tilting of the wings. In the event of engine failure with any one of the three forms of the invention, the velocity of the plane as it glides towards the earth can be intermittently reduced by sequential pivoting of the wings to tilted positions relative to the fuselage of the plane.

The wing U of the second alternate form shown in FIGURES 9 to 12, is of delta design and has an airfoil cross section. Wing U supports the jet engine V, with the direction of flight of the second alternate form of the plane being controllable not only by concurrent pivoting of the wing and engine relative to the fuselage R, but by pivotal movement of the deflectors 224, 226, 228 and 230. Vertical movement of the second alternate form of plane is also achieved by pivotal movement of stabilizer 122.

The pumps 74 and 176 may be driven by motors 76 and 180 respectively, by power take-off from the engines powering the three forms of planes, or by other desired power sources. Should it be desired, the wings G, G' and U may be mechanically locked in their normal horizontal positions by conventional latching devices (not shown).

From the previous description thereof, it will be apparent that the tiltable wing structure of the present invention can be applied to propeller-driven planes, high, mid or low wing planes, single or multi-engine planes, jet-propelled planes, as well as delta planform and other unconventional aircraft designs. In illustrating the controlled tilting of the wings, it has been found convenient to use hydraulic power as an example. However, electrical power, pneumatic, or electromechanical power can be utilized for this purpose if desired.

Actual flight tests have been made with models of the airplane shown in FIGURES 1–5 inclusive. These models were one-sixth normal size of their counterpart, and were radio controlled. This size was selected as the NACA data indicated that tests made of a model of this size would provide valid test data for application to a full-sized aircraft.

The control system used on the test model is a completely proportional simultaneous system providing a complete duplication of the control functions in the full-sized aircraft, thus enabling the pilot to perform any function in the test aircraft that could be performed in the full-sized aircraft with a pilot at the controls, except that the rudder and aileron commands were electronically coupled so as to provide simultaneous coordinated control of these two functions.

The flight test data indicated the following facts:

(a) Lift off on take-off could be achieved at a much earlier time by rotating the airfoil to increase the angle of attack during take-off;
(b) Landing speed and roll could be greatly reduced; in fact, almost to zero by utilizing the full tilt feature;
(c) Transition in flight was accomplished smoothly and easily both from normal to full tilt condition and back to normal again.

Manipulation of the deflectors 224, 226, 228 and 230 may be by power means (not shown) that are actuated by radio or radar signals. Such steering of a jet propelled vehicle is particularly useful when applied to rockets and missiles.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. In combination with an engine driven aircraft that includes a fuselage:
(a) a wing extending transversely across at least a portion of said fuselage;
(b) first means for pivotally connecting said wing to said fuselage;
(c) power means for pivoting said wing between a first position and a second position, which wing when in said second position tilts downwardly and rearwardly at a greater angle than when in said first position; and
(d) transparent rigid means attached directly to said wing for movement therewith as said wing pivots between said first and second positions, which transparent means protectively covers an opening formed in said fuselage from a windstream when said aircraft is in motion.

2. An aircraft as defined in claim 1 wherein said transparent means comprises a transparent rigid shell that extends downwardly from said wing through said opening in said fuselage.

3. An aircraft as defined in claim 1 wherein said transparent means comprises a transparent rigid shell that extends downwardly from said wing through said opening in said fuselage, and said shell is so shaped as to engage the edges of said fuselage defining said opening and is movable relative thereto.

4. An aircraft as defined in claim 1 wherein said transparent means comprises a transparent rigid shell that extends downwardly from said wing through said opening in said fuselage and said shell has curved rear and forward portions that sealingly engage edge portions of said fuselage which define said opening as said wing is pivoted by said power means.

5. In combination with an engine driven aircraft that includes a fuselage:
(a) a wing extending transversely across at least a portion of said fuselage, in the upper portion of which an opening is formed, said wing including a central portion narrower in width than the balance thereof, which central portion has a curved upper airfoil surface that is in sealing engagement with an edge portion of said fuselage that defines said opening;
(b) first means for pivotally connecting said wing to said fuselage, which first means includes rigid frames affixed to said wing and extending downwardly therefrom, together with pins affixed to said fuselage that pivotally support said frames;
(c) power means for pivoting said wing between a first position and a second position, which wing when in said second position tilts downwardly and rearwardly at a greater angle than when in said first position; and
(d) transparent rigid means attached directly to said wing for movement therewith as said wing pivots between said first and second positions, which transparent means protectively covers said opening in said fuselage from a windstream when said aircraft is in motion, and the radius of curvature of said curved airfoil surface of said central portion is such that said upper airfoil surface remains in said sealing engagement with said edge as said wing pivots between said first and second positions.

6. In combination with an engine driven aircraft that includes a fuselage:
(a) a wing extending transversely across at least a portion of said fuselage in the upper portion of which an opening is formed;
(b) first means for pivotally connecting said wing to said fuselage;
(c) power means for pivoting said wing between a first position and a second position, which wing when in said second position tilts downwardly and rearwardly at a greater angle than when in said first position; and
(d) transparent rigid means supported from said wing for protectively covering said opening from a windstream when said aicraft is in motion, with said wing including a central portion narrower in width than the balance thereof, and said central portion having a curved airfoil surface that is in sealing engagement with an edge portion of said fuselage that defines said opening, and with said airfoil surface having a radius of curvature such that said airfoil surface remains in said sealing engagement with said edge as said wing pivots between said first and second positions.

References Cited by the Examiner

UNITED STATES PATENTS

| | | | |
|---|---|---|---|
| 1,949,787 | 3/34 | Dugan | 244—48 |
| 2,389,274 | 11/45 | Pearsall et al. | 244—85 X |
| 2,444,976 | 7/48 | Brown. | |
| 2,490,664 | 12/49 | Villepigue | 244—121 |
| 2,778,586 | 1/57 | Nyerges et al. | 244—121 X |
| 2,912,191 | 11/59 | Millam | 244—48 |

FERGUS S. MIDDLETON, *Primary Examiner.*